United States Patent [19]

Yedor

[11] 4,406,374

[45] Sep. 27, 1983

[54] LOCKING DEVICE FOR DISPLAY RACK

[75] Inventor: Harry M. Yedor, Northbrook, Ill.

[73] Assignee: Myco, Inc., Des Plaines, Ill.

[21] Appl. No.: 265,776

[22] Filed: Aug. 12, 1981

[51] Int. Cl.³ .............................................. A47F 5/00
[52] U.S. Cl. .................................. 211/192; 403/254; 403/317
[58] Field of Search ............... 211/192, 191, 190, 208, 211/187; 403/254, 316, 317; 248/243; 108/107

[56] References Cited

U.S. PATENT DOCUMENTS

| 3,601,432 | 8/1971 | Fenwick | 211/192 X |
| 3,680,711 | 8/1972 | Bruckner | 211/192 X |
| 3,730,108 | 5/1973 | Stroh | 211/192 X |

FOREIGN PATENT DOCUMENTS

| 818459 | 8/1959 | United Kingdom | 211/192 |
| 1148389 | 4/1969 | United Kingdom | 211/208 |
| 2044079 | 10/1980 | United Kingdom | 211/192 |

Primary Examiner—Ramon S. Britts
Assistant Examiner—Robert W. Gibson, Jr.
Attorney, Agent, or Firm—Marvin N. Benn

[57] ABSTRACT

A locking bracket for securing a hook and slot connection between the vertical and horizontal support members of a rack assembly is slidably mounted on the upper surface of the horizontal support member and includes locking portions adapted for being slidably received in openings of the vertical member slots above the horizontal member hooks to prevent vertical disassociation of the support members. The locking portions comprise inclined surfaces which are wedged into the slot openings to secure the connection.

6 Claims, 2 Drawing Figures

LOCKING DEVICE FOR DISPLAY RACK

BACKGROUND OF THE INVENTION

The present invention relates to display racks and the like of the type which are assembled by suitably interconnecting a plurality of vertical and horizontal members and, more particularly, to a device for facilitating the locking engagement of the vertical and horizontal members in such an assembly.

Display racks and the like which are assembled by suitably interconnecting a plurality of vertical and horizontal support members to form a multiple shelf rack assembly are commonly used for supporting and displaying various types of articles both in commercial establishments and in private homes. Such rack assemblies are typically provided in a "knocked-down" form and assembled by the user to satisfy his or her particular requirements, which requirements depend upon the amount of desired storage capacity as well as the space available in which to assemble the unit. The vertical and horizontal members are typically interconnected by a cooperating hook and slot arrangement which prevents disassociation of the members in a horizontal direction. In order to prevent vertical disassociation of the members a locking device is often provided in an attempt to fixedly and securely maintain the hook and slot connection. Prior art locking devices designed for this purpose have not, however, proven to be altogether satisfactory. In particular, some of the disadvantages associated with these prior art locking devices include the use of relatively complex and therefore costly mechanical locking arrangements, the use of locking devices which are difficult for an untrained person to install and the use of locking devices which do not provide a suitably secure connection. In addition, known prior art locking devices are not adapted for securing hook and slot connections wherein the longitudinal dimensions of the slots are variable.

One typical prior art technique for securing the tongue or hook and slot connection has been the use of pivotally mounted locking members. For example, U.S. Pat. No. 3,601,432 to Fenwick discloses the use of a pivotal member for inserting a locking tab into the slot in order to prevent the hook from being withdrawn therefrom. Other examples of pivotally operable locking devices are disclosed in U.S. Pat. Nos. 4,048,768, and 4,154,419 to Good and Breidenback respectively. The use of spring-biased locking devices is also known in the art as exemplified by U.S. Pat. Nos. 3,680,711 and 3,697,034 to Brucker and Shell respectively. U.S. Pat. No. 1,008,720 to Knape teaches a locking device having a projection slidably insertable within the slot opening above the mating hook for preventing withdrawal thereof from the slot. Other prior art locking devices are disclosed in U.S. Pat. Nos. 3,456 and 3,356,328 to Sunasky and Sachau respectively.

SUMMARY OF THE INVENTION

A basic object of the present invention is to provide an improved locking device for securing a hook and slot connection between the vertical and horizontal support members of a rack assembly.

A further object of the invention is to provide such a locking device which is relatively simple in construction and inexpensive to manufacture.

Another object of the invention is to provide such a locking device which is relatively easy to use while reliably preventing the vertical disassociation of the hook and slot connection.

Yet another object of the invention is to provide such a lock device which may be used with slots having different longitudinal dimensions.

In accordance with these and other objects, the locking device of the present invention comprises a locking bracket disposed in sliding relation on the upper surface of a horizontal support member of a rack assembly, the horizontal member including a pair of transversely spaced protruding hook portions adapted for interlocking with a pair of transversely spaced vertically extending elongate slots formed in a vertical support member such that an opening is left in the upper portion of each slot above its received hook portion. The locking bracket includes a pair of transversely spaced locking members each comprising a horizontally extending surface inclining in an upwardly direction away from the vertical member, the locking bracket being slidable to a position such that the inclined surfaces are received within the slot openings in abutting relation with the upper surfaces of the slots to inhibit relative vertical movement between the vertical and horizontal members. Means are also provided for locking the bracket in the foregoing position.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several figures and in which:

DESCRIPTION OF THE PREFERRED EMBODIMENT

Figure 1:
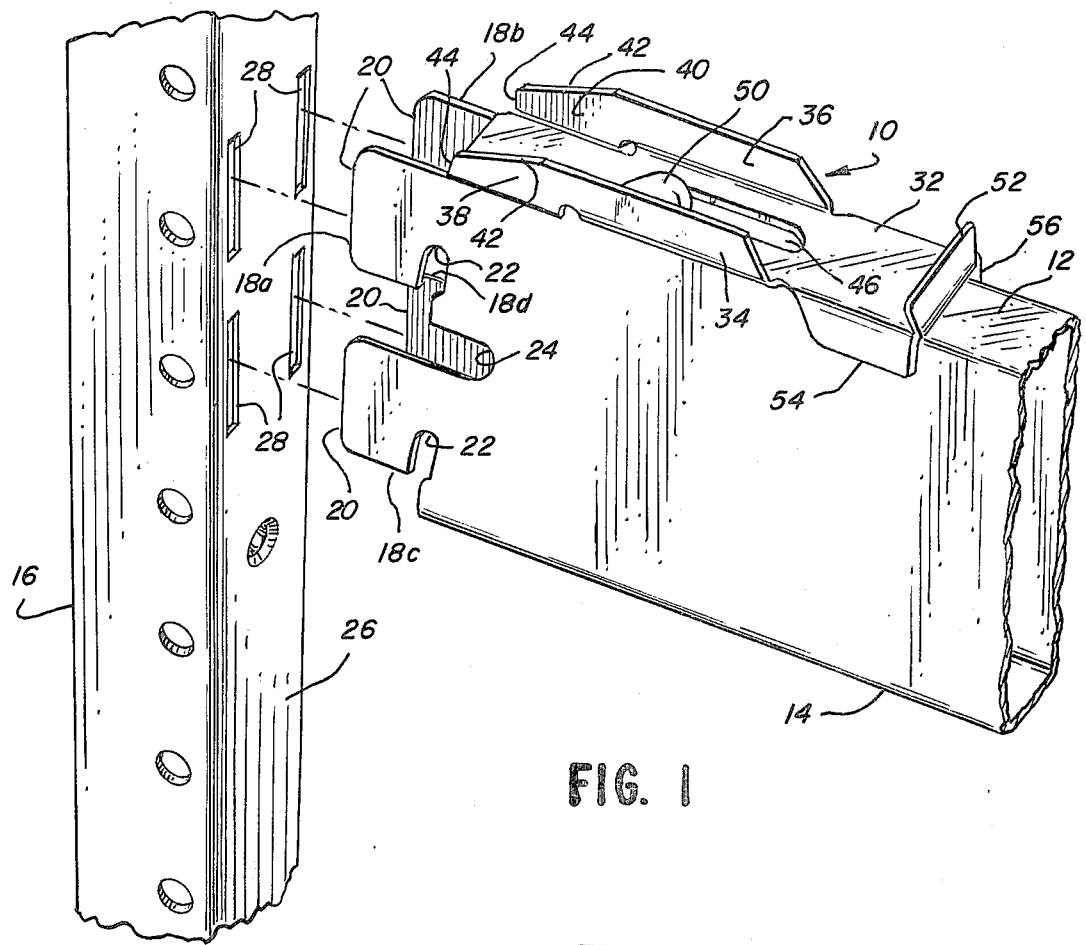
FIG. 1 is a perspective view showing the vertical and horizontal support members of a rack assembly in a disengaged configuration, the horizontal support member carrying the locking device of the present invention.
Figure 2:
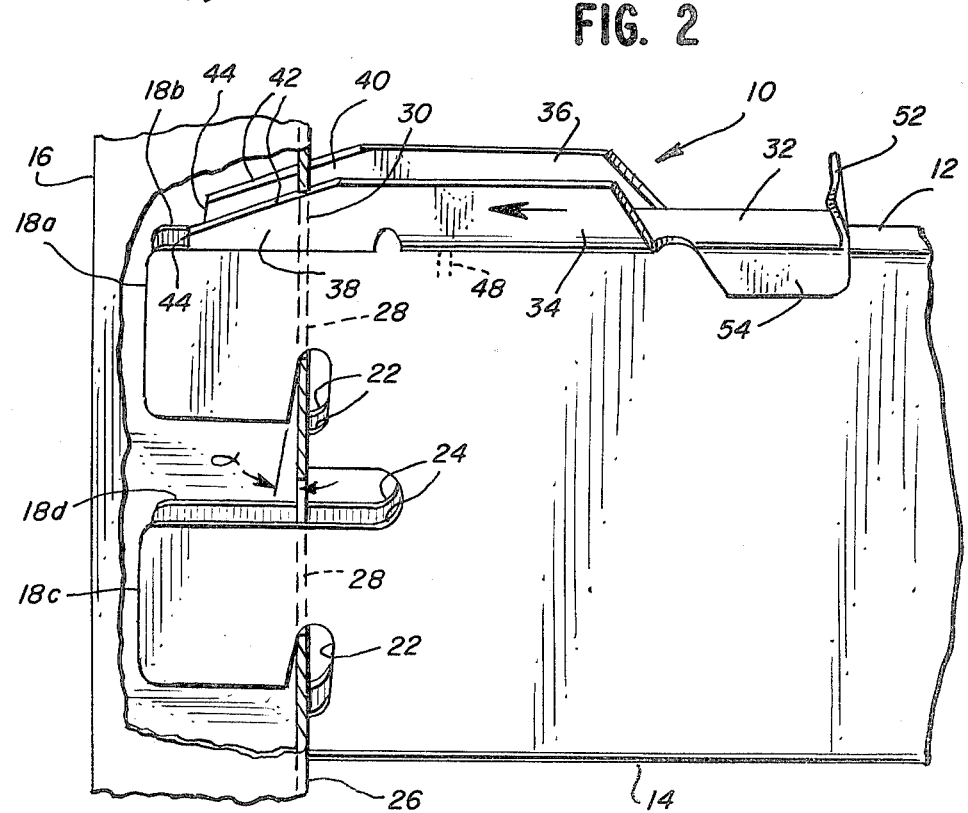
FIG. 2 is a partially broken perspective view similar to FIG. 1 but illustrating the support members in an engaged and locked configuration.

Referring now to the drawings, and in particular to FIG. 1, the locking device of the present invention is indicated generally by reference numeral 10 and comprises a locking bracket disposed in sliding relation on an upper horizontal surface 12 of a horizontal support member 14. Horizontal support member 14 is configured for mating with a vertical support member or post 16 such that a display rack or the like of a desired configuration may be assembled by suitably interconnecting a number of the horizontal and vertical support members.

In particular, horizontal support member 14 includes a pair of transversely spaced upper hook members 18a and 18b longitudinally extending from a distal end thereof, each of the hook members including an arm 20 depending from upper surface 12 and having a notch 22 cut therein. In addition, a second pair of transversely spaced hook members 18c and 18d extend longitudinally from the distal end of horizontal support member 14 below and separated from upper hook members 18a and 18b by a pair of slots 24, each of the lower back hook members also comprising an arm 20 having a notch 22 cut therein. Vertical support member 16 includes an inwardly facing wall 26 in which there is formed an arrangement of four vertically extending elongate slots 28 disposed for receiving the arms 20 of hook members 18a–18d. Horizontal support member 14 is mateable with vertical support member 16 by guiding the arms 20 of hook members 18a–18d through respective ones of the slots 28, the portions of wall 26 between vertically aligned pairs of slots 28 being received by longitudinal slots 24, until the notches 22 of the hook members are disposed in aligned registration with the vertical support member slots 28. Horizontal support member 14 is then moved in a downwardly direction relative to vertical support member 16 until the upper ends of notches 22 seat on the bottom surfaces of slots 28, the notches 22 thereby engaging or biting the wall 26 for preventing horizontal disassociation of horizontal and vertical support members 14 and 16. Also, as a result of the foregoing interconnection, an opening 30 is left in each elongate slot 28 above its respective hook member 18a–18c allowing for unwanted vertical displacement between the two support members. As will be explained in detail hereinafter, locking bracket 10 is conveniently operative for filling the openings 30 to prevent such vertical displacement whereby the hook and groove connection between the support members is securely maintained.

Locking bracket 10 comprises a substantially flat base 32 disposed in sliding relation on upper surface 12 of horizontal support member 14. A pair of transversely spaced opposed side walls 34 and 36 project upwardly from base 32 and terminate in a pair of integrally formed locking members 38 and 40 respectively near upper hook members 18a and 18b. Each of the locking members 38 and 40 comprises an inclined upper surface 42 extending from a distal end 44 to its juncture with one of the side walls 34 or 36. Inclined surfaces 42 at distal end 44 is spaced above surface 12 by an amount less than the vertical dimensions of openings 30 and at the juncture with side walls 34 and 36 by an amount greater than the vertical dimensions of openings 30. A longitudinal elongate slot 46 is formed in base 32 of locking bracket 10 between side walls 34 and 36 and overlies a threaded aperture 48 formed in surface 12 of horizontal support member 14, a locking screw 50 passing through elongate slot 46 and engaging threaded aperture 48 for locking the bracket 10 in a desired longitudinal position on surface 12. Bracket 10 further includes, at its end opposite locking members 38 and 40, an upstanding transversely disposed tab 52 providing a bearing surface for facilitating the sliding displacement of the bracket along horizontal surface 12. A pair of opposed guide feet 54 and 56 depend from base 32 intermediate tab 52 and side walls 34 and 36, the guide feet 54 and 56 serving to inhibit transverse displacement of locking bracket 10 when mounted on horizontal support member 14.

As previously described, when the hook and slot connection between horizontal and vertical support members 14 and 16 is initially formed an opening 30 is left in each slot 28 above its respective hook member 18a–18d allowing for unwanted vertical displacement between the support members, locking bracket 10 being operative for inhibiting this unwanted vertical displacement. In particular, after the hook and slot connection is formed, locking screw 50 is loosened from engagement with aperture 48 allowing bracket 10 to be longitudinally displaced along surface 12 of horizontal support member 14. Bracket 10 is subsequently slidably displaced along surface 12 toward vertical support member 16 with distal ends 44 of locking members 38 and 40 being received in openings 30 of slots 28 above hook members 18a and 18b. This sliding motion of the locking bracket is continued until inclined surfaces 42 of locking members 38 and 40 are brought into abutting engagement with the upper transverse surfaces of slots 28 thereby filling the openings 30 and preventing relative vertical displacement between the support members. At this time, locking screw 50 is tightened to secure the bracket 10 in its locked position.

It will be appreciated that disengagement of bracket 10 from its locked position involves a procedure similar to that described above but performed in reverse order. That is, locking screw 50 is initially loosened freeing the bracket which is then slidingly withdrawn from slots 28. Hook members 18a–18d are thus disengaged and may be vertically displaced for facilitating disconnection of the support members.

It will thus be seen that locking bracket 10 provides a convenient and easily useable facility for securing a hook and slot connection between support members 14 and 16. Furthermore, due to the use of inclined surfaces 42, the locking bracket may accommodate a vertical support member having elongate slots 28 of various vertical dimensions.

While a particular embodiment of the invention has been shown and described, it will be apparent that changes and modifications may be made therein without departing from the invention in its broader aspects. The aim of the appended claims, therefore, is to cover all such changes and modifications as fall within the true spirit and scope of the invention.

What is claimed is:

1. A locking device for use with a rack assembly of the type having a vertical member including one wall in which there is formed a vertically extending elongate slot and a horizontal member including a horizontally extending upper surface and a hook portion depending therefrom, said hook portion being receivable within said slot for providing a horizontally secure engagement between said vertical and horizontal member upon relative downward movement of said hook portion within said slot, whereupon an opening is left at the upper portion of said slot above said received hook portion, said locking device comprising:

bracket means disposed in horizontal sliding relation on said horizontal member upon surface, said bracket means including a locking member transversely dimensioned for receipt in said slot and comprising a horizontally extending surface inclining in an upwardly direction away from said vertical member to a height above said horizontal member upper surface greater than the vertical dimension of said slot opening, said locking member being slidable to a position within said slot opening wherein said inclined surface is brought into abutting engagement with the upper surface of said slot for inhibiting relative vertical movement between said vertical and horizontal members; and
means for locking said bracket means in said engaged position.

2. A locking device according to claim 1 wherein said bracket means includes a transverse upstanding tab horizontally spaced from said locking member for facilitating horizontal movement of said bracket means towards and away from said vertical member.

3. A locking device according to claim 1 wherein said horizontal member upper surface includes a screw engaging aperture, said bracket means including a horizontally disposed elongate slot overlying said aperture and further including a locking screw passing through said bracket means slot for engagement by said aperture for locking said bracket means in position on said horizontal member upper surface.

4. A locking device for use with a rack assembly of the type having a vertical member including one wall in which there is formed a pair of transversely spaced vertically extending elongate slots and a horizontal member including a horizontally extending upper surface and a pair of transversely spaced hook portions depending therefrom, each of said hook portions being receivable within a respective one of said slots for providing a horizontally secure engagement between said vertical and horizontal members upon relative downward movement of said hook portions within said slots, whereupon an opening is left at the upper portion of each of said slots above said received hook portions, said locking device comprising:

bracket means disposed in horizontal sliding relation on said horizontal member upper surface, said bracket means including a pair of transversely spaced locking members each dimensioned for receipt in a respective one of said slots and each comprising a horizontally extending surface inclining in an upwardly direction away from said vertical member to a height above said horizontal member upper surface greater than the vertical dimension of said slot openings, each of said locking members being slidable to a position within a respective one of said slot openings wherein said inclined surface thereof is brought into surface of the respective slot for inhibiting relative vertical movement between said vertical and horizontal members; and means for locking said bracket means in said engaged portion.

5. A locking device according to claim 4 wherein said bracket means includes a transverse upstanding tab horizontally spaced from said locking members for facilitating horizontal movement of said bracket means towards and away from said vertical member.

6. A locking device according to claim 4 wherein said horizontal member upper surface includes a screw engaging aperture, said bracket means including a horizontally disposed elongate slot overlying said aperture and further including a locking screw passing through said bracket means slot for engagement by said aperture for locking said bracket means in position on said horizontal member upper surface.

* * * * *